United States Patent Office.

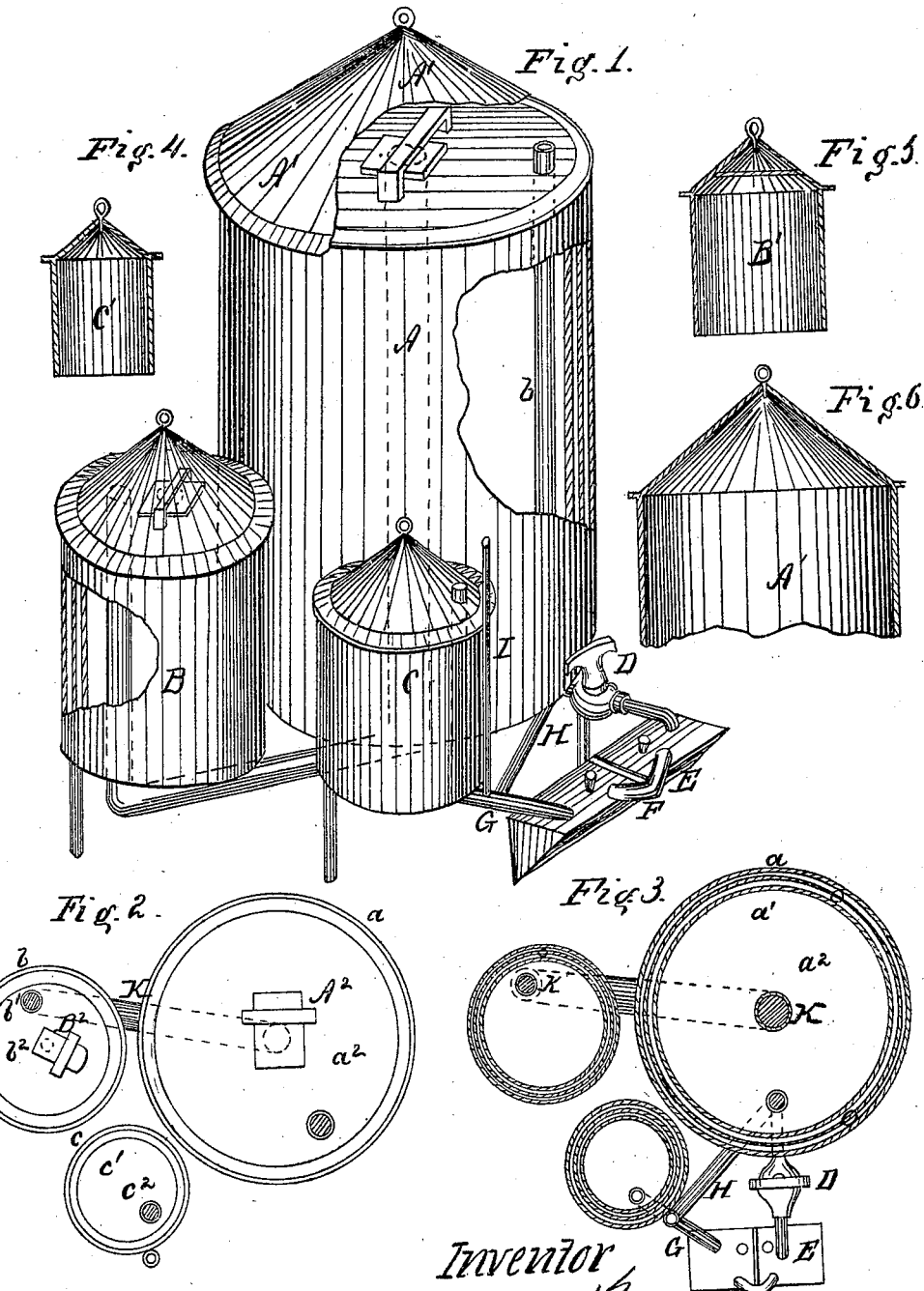

PATRICK KELLY, OF DAYTON, OHIO.

Letters Patent No. 92,317, dated July 6, 1869.

IMPROVED GAS-GENERATOR.

The Schedule referred to in these Letters Patent and making part of the same.

*To all whom it may concern:*

Be it known that I, PATRICK KELLY, of Dayton, in the county of Montgomery, and State of Ohio, have invented a new and useful Improvement in Gas-Generators; and I hereby declare that the following is a full, clear, and exact description of the same, reference being had to the annexed drawings making part of this specification, in which—

Figure 1 is a perspective view of the apparatus.

Figure 2 is a plan view with the gasometers removed.

Figure 3 is a horizontal section, and

Figures 4, 5, and 6, are elevations of the gasometers.

The same letters in all the figures indicate the same parts.

My improvements relate to apparatus for carburetting atmospheric air, by passing it through gasoline, to make an illuminating-gas, and My improvement consists in a better construction and arrangement of parts of the apparatus.

In the annexed drawings—

A is a tank formed by two walls, $a$ and $a^1$, having between them a narrow space to be filled with water to receive the gasometer $A^1$.

$a^2$ is a plate extending across the top of the cylinder $a^1$, so as to make the gasometer air-tight.

The tank B is constructed, like the tank A, of the parts $b$, $b^1$, and $b^2$, to receive the gasometer $B^1$.

A pipe, K, opens through the plate $b^2$, and extending downwards through the cylinder $b$, passes from under the tank B, and thence is carried under the tank A, through the plate $a^2$, opening under the gasometer $A^1$, being covered by a flap-valve, $A^2$, opening only upwards.

A similar valve, $B^2$, covers a hole in the plate $b^2$, opening into the air below the plate $b^2$. The space between the walls $a$ and $a^1$, and $b$ and $b^1$, being filled with water, and the gasometer being placed therein and at the bottom, by raising said gasometer a vacuum would be formed under it, to fill which the air will rush in through the valve $B^2$, which opens upwards by the pressure of the external atmosphere.

When the gasometer B has been raised nearly to the surface of the water, the cords by which it is raised having been released, its gravity will force the air confined under it down through the pipe K, and upwards through the valve $A^2$ into the gasometer $A^1$. By successively raising the gasometer, it may be made to fill the larger gasometer $A^1$.

The pipe D opens into the air-chamber of the gasometer $A^1$, through the plate $a^2$, and extending downwards, having a cock therein to regulate the discharge, it opens into the chamber E. This is an air-tight triangular chamber, to be filled or partly filled with gasoline, the chamber being, however, first charged with a small quantity of a solution of muriatic acid and zinc, to form a bed upon which the gasoline rests.

The chamber is divided into two or more compartments, and the pipe D is extended down to the bottom of the first of the series, and the air discharged into the bed of muriatic acid and zinc, whence, rising through the gasoline, it is, in its passage, carburetted partially.

The compartments are connected by a bent pipe, F, one end of which opens into the top of the first compartment, and the other extends to the bottom of the second compartment, where the partially-carburetted air is again discharged into the bed, to rise through the gasoline in said chamber, by which means it will be sufficiently carburetted for ordinary use.

The number of the carburetting-chambers may, however, if desired, be multiplied in the same manner by a continuous series of compartments and connecting-pipes.

The intensity of the illumination of the gas may be increased by first introducing within said chambers muriatic acid, and then adding the gasoline, and finally putting in as much zinc as will create a slight vapor while being dissolved.

The pipe G conducts the carburetted air or gas from the last chamber of the series, and delivers it into a gasometer $C^1$, placed in a tank, C.

A pipe, H, connected with the pipe G, leads under the pipe D transversely in a gas-burner, by means of which the air passing through the pipe D may be heated as it passes from the gasometer.

The waste heat from the gas-burner, opening into the space below the plate $a^2$, will tend to warm the air in the gasometer $A^1$. By heating the air, its carburetting will be facilitated.

The pipe I connects with the gas-pipes, through which the gas is carried away to be burned. This connecting with the pipe G may be used in connection with or independently of the gasometer $C^1$, which is not necessary, but may be conveniently used for storing the illuminating-gas.

What I claim as my invention, and desire to secure by Letters Patent, is—

An apparatus for carburetting air, combining in its construction the following groups of elements:

First, a gasometer for pumping air with induction-valve and eduction-pipe;

Second, a storing-gasometer, with an induction-valve and eduction-pipe.

Third, a series of carburetting-chambers, containing the chemicals, connected by pipes arranged to carry the air through such chemicals; and Fourth, a gas-pipe, through which the gas is carried for use, and having a branch-pipe with gas-jet, arranged to heat the air in the pipe D, said parts being arranged substantially as and for the purpose set forth.

In testimony whereof, I have signed my name to this specification, in the presence of two subscribing witnesses.

PATRICK KELLY.

Witnesses:
DAVID MEYER,
SOLOMON BOOKWALTER.